(12) United States Patent
Miyano

(10) Patent No.: US 9,411,463 B2
(45) Date of Patent: Aug. 9, 2016

(54) ELECTRONIC DEVICE HAVING A TOUCHSCREEN PANEL FOR PEN INPUT AND METHOD FOR DISPLAYING CONTENT

(75) Inventor: Yasuhiro Miyano, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 70 days.

(21) Appl. No.: 14/000,579

(22) PCT Filed: Feb. 8, 2012

(86) PCT No.: PCT/JP2012/052860
§ 371 (c)(1),
(2), (4) Date: Aug. 20, 2013

(87) PCT Pub. No.: WO2012/114876
PCT Pub. Date: Aug. 30, 2012

(65) Prior Publication Data
US 2013/0328819 A1 Dec. 12, 2013

(30) Foreign Application Priority Data
Feb. 21, 2011 (JP) ................................. 2011-034163

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01)

(58) Field of Classification Search
CPC . G06F 3/0412; G06F 3/0416; G06F 3/03545; G06F 3/03547; G06F 3/0481; G06F 3/0483; G06F 3/0485; G06F 3/04883; G06F 2203/04104; G06F 2203/04808; G09B 7/00; G09B 7/063; G06K 9/222; H04N 1/00392
See application file for complete search history.

(56) References Cited

U.S. PATENT DOCUMENTS

| | | | |
|---|---|---|---|
| 5,864,636 A | 1/1999 | Chisaka | |
| 5,973,676 A * | 10/1999 | Kawakura | 345/173 |
| 6,256,009 B1 * | 7/2001 | Lui | G06F 3/04883 178/18.03 |
| 6,323,846 B1 * | 11/2001 | Westerman et al. | 345/173 |
| 2003/0080946 A1* | 5/2003 | Chuang | 345/173 |
| 2004/0021647 A1* | 2/2004 | Iwema et al. | 345/179 |

(Continued)

FOREIGN PATENT DOCUMENTS

| | | | |
|---|---|---|---|
| JP | 7-141092 A | 6/1995 | |
| JP | 8-185479 A | 7/1996 | |

(Continued)

OTHER PUBLICATIONS

International Search Report for PCT/JP2012/052860 dated Mar. 19, 2012.
Obata, "Denshi Shoseki Jidai no 'PDF' Katsuyojutsu", Ascii. PC, vol. 14, No. 5, Jan. 24, 2011, pp. 36-37.
Written Opinion of the International Searching Authority for PCT/JP2012/052860 dated Mar. 12, 2012.

*Primary Examiner* — Keith Crawley
(74) *Attorney, Agent, or Firm* — Birch, Stewart, Kolasch & Birch, LLP

(57) ABSTRACT

Improved operability can be achieved in receiving a handwritten input via a touchscreen panel. An electronic device includes a touchscreen panel, a memory for storing content having at least one predetermined position set for the content, and a processor for obtaining a first touched position via the touchscreen panel, and causing the touchscreen panel to display the content thereon based on the first touched position and the predetermined position.

8 Claims, 11 Drawing Sheets

(56) References Cited

U.S. PATENT DOCUMENTS

| | | |
|---|---|---|
| 2006/0109252 A1* | 5/2006 | Kolmykov-Zotov et al. ... 345/173 |
| 2006/0246410 A1 | 11/2006 | Iwayama |
| 2007/0177801 A1* | 8/2007 | Kawamoto et al. ... 382/187 |
| 2009/0095540 A1* | 4/2009 | Zachut et al. ... 178/18.03 |
| 2010/0026649 A1* | 2/2010 | Shimizu et al. ... 345/173 |
| 2011/0134028 A1 | 6/2011 | Hiroshima et al. |
| 2011/0157028 A1* | 6/2011 | Stallings et al. ... 345/173 |
| 2014/0192016 A1* | 7/2014 | Yoshino ... 345/174 |
| 2014/0210797 A1* | 7/2014 | Kreek et al. ... 345/179 |

FOREIGN PATENT DOCUMENTS

| | | |
|---|---|---|
| JP | 10-301705 A | 11/1998 |
| JP | 2005-301406 A | 10/2005 |
| JP | 2006-308925 A | 11/2006 |
| JP | 2008-242541 A | 10/2008 |
| JP | 2009-237836 A | 10/2009 |
| JP | 2010-118047 A | 5/2010 |

* cited by examiner

ELECTRONIC DEVICE HAVING A TOUCHSCREEN PANEL FOR PEN INPUT AND METHOD FOR DISPLAYING CONTENT

TECHNICAL FIELD

The present invention relates to an electronic device, a method for displaying content, and a program employed to display content, that allow a touchscreen panel to display characters, images and other, similar contents thereon.

BACKGROUND ART

There is a technique known to allow a touchscreen panel to display characters, images and the like thereon. Furthermore, there is also a technique known to allow a touchscreen panel to receive and display handwritten characters, hand-drawn images and the like thereon. Furthermore, there is also a technique known to allow a touchscreen panel to receive an instruction to scroll a screen.

For example, Japanese Patent Laying-Open No. 2005-301406 (PTD 1) discloses a character input device and a method for controlling displaying an input frame. According to Japanese Patent Laying-Open No. 2005-301406 (PTD 1), the character input device includes a character recognition means to recognize a character based on an input handwritten in the input frame and detected by an input reception means. An input frame scrolling means responds to the input reception means detecting that a predetermined input frame having received an input handwritten therein or a scroll reception means detecting that a right/left scrolling button has been pressed by performing automatic scrolling, leftward scrolling or rightward scrolling to scroll the input frame displayed on a display screen. A display processing means displays on the display screen a resultantly recognized character and a resultant scrolling.

Furthermore, Japanese Patent Laying-Open No. 2009-237836 (PTD 2) discloses in-vehicle electronic equipment including a handwriting input panel. According to Japanese Patent Laying-Open No. 2009-237836 (PTD 2), in-vehicle electronic equipment provided with a display unit having a handwriting input panel for inputting handwritten characters, and the handwriting input panel for displaying a character input frame on the display unit, and for identifying and specifying characters handwritten and thus input in the character input frame, is provided with an angle detection unit for detecting an angle made by a display screen on which an operator inputs characters to the character input frame displayed on the display unit and a direction in the operation by the operator, and an input frame switching unit for switching displaying the character input frame to be displayed on the display unit, and the input frame switching unit operates in response to a result detected by the angle detection unit to rotate the character input frame at a different angle to switch displaying the character input frame.

Furthermore, Japanese Patent Laying-Open No. 10-301705 (PTD 3) discloses a handwriting input device. According to Japanese Patent Laying-Open No. 10-301705 (PTD 3), a button is provided within a handwriting input frame to be operated to indicate that a position at which the handwriting input frame is displayed is changed, and when the button is touched, a means is initiated for changing a position at which the handwriting input frame is displayed, and the handwriting input frame is displayed at an indicated position and concurrently the changed position at which the handwriting input frame is displayed is stored to memory.

Furthermore, Japanese Patent Laying-Open No. 8-185479 (PTD 4) discloses a handwritten character input device. According to Japanese Patent Laying-Open No. 8-185479 (PTD 4), a character input frame information generation unit generates character input frame information based on coordinate input position information received from a coordinate input unit, and stores it to a first storage unit. A character recognition unit recognizes a character cut out by a character cutting-out unit, and stores resultantly recognized character code data to a second storage unit. A display control unit uses the character input frame information received from the first storage unit to pop up and thus display a character input frame on a display panel from an initial input position. Furthermore, the character input frame information generation unit follows information received from the character recognition unit and indicating an end of recognition to delete content stored in the first storage unit. The character input frame is thus automatically deleted once character recognition has been completed. Note that in doing so the character input frame is simply a frame forming a matrix of cells which are transparent therein and do not hide typed characters or the like.

Furthermore, Japanese Patent Laying-Open No. 7-141092 (PTD 5) discloses a handwriting input device. According to Japanese Patent Laying-Open No. 7-141092 (PTD 5), when an input and display device receives a "M:2" handwritten and thus input on a screen as a memo command, a memo window is opened with reference to the position at which the memo command is input. At the time, in the memo window is displayed the image data of a memo number 2 specified by the memo command. When updating memo number 2's memo content, update data is handwritten in the memo window and thus input. When the memo content has been updated and the memo window is to be closed, a predetermined handwriting operation is performed at a frame reference position box. Thus the memo window is deleted and memo number 2's memo data is updated by the latest image data currently displayed in the memo window.

CITATION LIST

Patent Documents

PTD 1: Japanese Patent Laying-Open No. 2005-301406
PTD 2: Japanese Patent Laying-Open No. 2009-237836
PTD 3: Japanese Patent Laying-Open No. 10-301705
PTD 4: Japanese Patent Laying-Open No. 8-185479
PTD 5: Japanese Patent Laying-Open No. 7-141092

SUMMARY OF INVENTION

Technical Problem

There is a demand for improved operability in receiving a handwritten input via a touchscreen panel. For example, there is a demand for a more convenient and less cumbersome method for inputting an instruction for scrolling.

The present invention has been made to overcome such an issue as above and it contemplates improved operability in receiving a handwritten input via a touchscreen panel.

Solution to Problem

The present invention in one aspect provides an electronic device including: a touchscreen panel; a memory for storing content having at least one predetermined position set for the content; and a processor for obtaining a first touched position via the touchscreen panel, and causing the touchscreen panel to display the content thereon based on the first touched position and the predetermined position.

Preferably, a plurality of predetermined positions are set for the content. The processor obtains a contact position of a pen on the touchscreen panel as a second touched position. When the content is displayed based on a first predetermined position of the plurality of predetermined positions, and in that condition the second touched position is no longer input and since then once a predetermined period of time has elapsed, then, the processor causes the touchscreen panel to display the content thereon based on the first touched position and a second predetermined position of the plurality of predetermined positions.

Preferably, the first touched position is a contact position of a palm on the touchscreen panel.

Preferably, the processor causes the touchscreen panel to display the content thereon such that the predetermined position relative to the first touched position is a first relative position.

Preferably, the processor obtains a contact position of a pen on the touchscreen panel as a second touched position. The processor stores the second touched position relative to the first touched position to the memory as the first relative position.

Preferably, a plurality of predetermined positions are set for the content. When the content is displayed based on a first predetermined position of the plurality of predetermined positions, and in that condition the first touched position is no longer input and since then once a predetermined period of time has elapsed, then, the processor causes the touchscreen panel to display the content thereon based on the first touched position and a second predetermined position of the plurality of predetermined positions.

Preferably, the first touched position corresponds to a contact position of a pen on the touchscreen panel.

Preferably, the processor causes the touchscreen panel to display the content thereon such that the first touched position matches the predetermined position.

Preferably, the processor stores a center of a rectangle surrounding the contact position of the pen to the memory as the first touched position based on time series data of the contact position of the pen on the touchscreen panel.

Preferably, a handwritten input receivable area and a handwritten input unreceivable area corresponding to each of the at least one predetermined position are set for the content. The at least one predetermined position corresponds to the handwritten input receivable area.

Preferably, the processor causes the touchscreen panel to display the content thereon such that the handwritten input receivable area and the handwritten input unreceivable area corresponding to the predetermined position that is a target are both entirely displayed based on the first touched position.

The present invention in another aspect provides a method for displaying content in an electronic device including a memory for storing content having at least one predetermined position set for the content, a touchscreen panel, and a processor. The method includes the steps of: obtaining, by the processor, a first touched position via the touchscreen panel; and causing, by the processor, the touchscreen panel to display the content thereon based on the first touched position and the predetermined position.

The present invention in another aspect provides a program for an electronic device to display content, the electronic device including a memory for storing content having at least one predetermined position set for the content, a touchscreen panel, and a processor. The program causes the processor to perform the steps of: obtaining a first touched position via the touchscreen panel; and causing the touchscreen panel to display the content thereon based on the first touched position and the predetermined position.

Advantageous Effect of Invention

The present invention can thus provide improved operability in receiving a handwritten input via a touchscreen panel.

DESCRIPTION OF EMBODIMENTS

Hereinafter reference will be made to the drawings to describe the present invention in embodiments. In the following description, identical components are identically denoted. Their names and functions are also identical. Accordingly, they will not be described repeatedly in detail. In the following description an electronic note is described as a representative example of an "electronic device." It should be noted, however, that the "electronic device" can also be implemented as a personal computer, a mobile phone, a personal digital assistant (PDA), or a similar information terminal having a touchscreen panel.

First Embodiment

Outlining how Electronic Note 100 Operates

Figure 1:
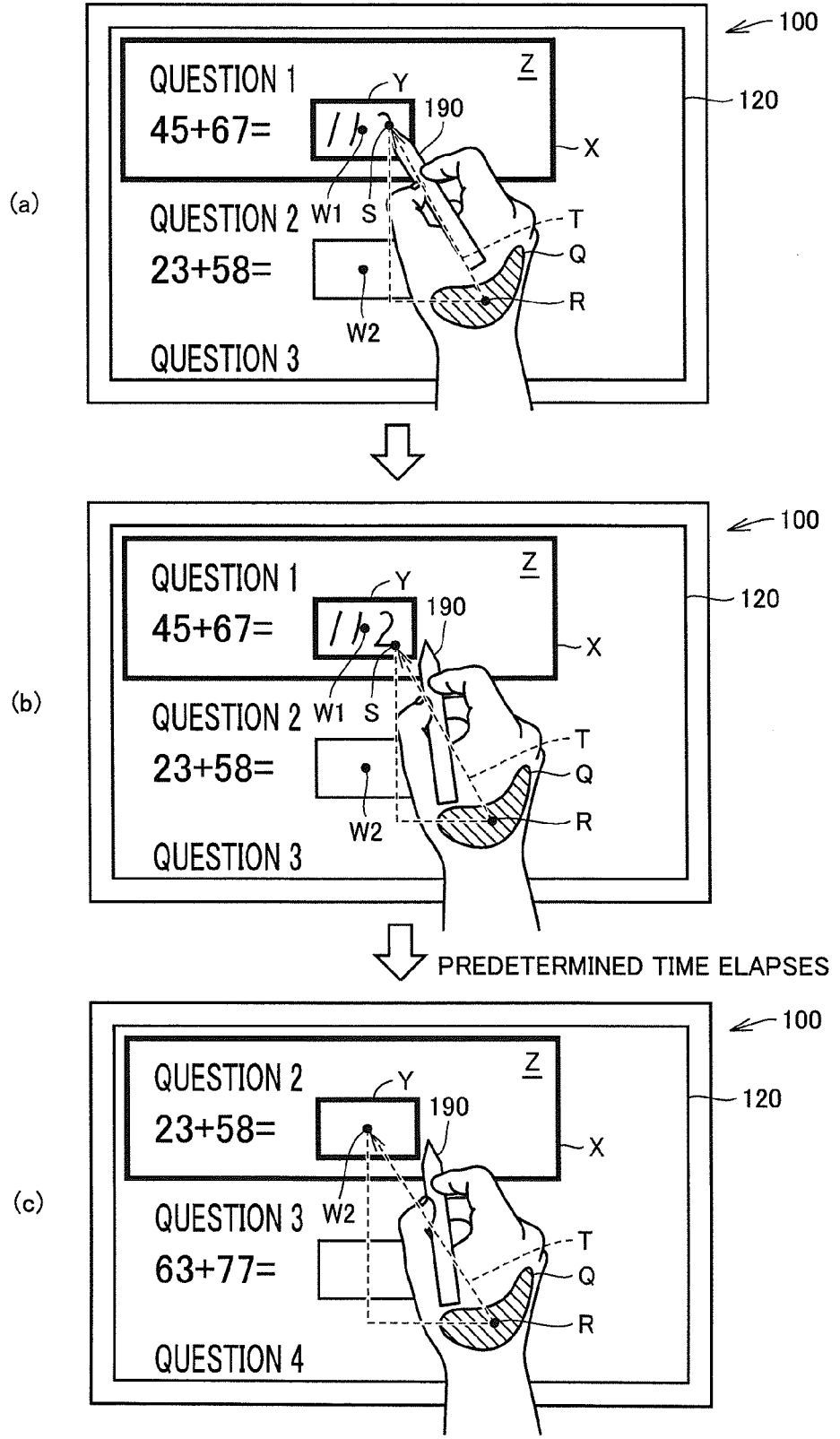
FIG. 1 outlines how an electronic note 100 according to an embodiment operates when it detects a palm and a nib and accordingly adjusts a position to display content.

Initially will be described how electronic note 100 according to a first embodiment operates when electronic note 100 detects a palm and a nib and accordingly adjusts a position to display content. FIG. 1 outlines how electronic note 100 according to the embodiment operates when electronic note 100 detects a palm and a nib and accordingly adjusts a position to display content.

More specifically, FIG. 1(a) shows a user handwriting and thus inputting characters with a stylus pen 190 with his/her palm in contact with a touchscreen panel 120. FIG. 1(b)

shows the user having detached stylus pen 190 from touchscreen panel 120. FIG. 1(c) shows electronic note 100 after stylus pen 190 is detached from touchscreen panel 120 when a predetermined period of time elapses.

With reference to FIGS. 1(a) to 1(c), touchscreen panel 120 of electronic note 100 displays content such as text, image and/or the like. Herein, the content includes a plurality of questions, and an answer area Y associated with each of the questions. In the content, a question area X and answer area Y are set for each question. Answer area Y may be included in question area X, or may be provided independently of question area X.

The content has stored information therein for determining a position for answer area Y for each question. For example, the content has stored therein information indicating a center position, an upper left end and/or the like of answer area Y for each question. Alternatively, text data, image data and/or the like for indicating answer area Y may per se be information indicating a position of the answer area. In other words, electronic note 100 may display a center of answer area Y or answer area Y at a preferable position based on the text data, image data and/or the like for indicating answer area Y.

Note that electronic note 100 according to the present embodiment receives an input handwritten in answer area Y and does not receive an input handwritten outside answer area Y.

With reference to FIG. 1(a), the user has his/her palm in contact with touchscreen panel 120. Electronic note 100 obtains a contact area Q on touchscreen panel 120 in which the user's palm is in contact with touchscreen panel 120. Electronic note 100 calculates the centroid of contact area Q or a center position of a rectangle surrounding the contact area as a contact position R of the palm. With reference to a question 1, the user handwrites and thus inputs an answer to answer area Y of question 1. Electronic note 100 successively obtains a contact position S on touchscreen panel 120 at which stylus pen 190 (or a finger of the user or the like) is in contact with touchscreen panel 120, and electronic note 100 accordingly displays a handwritten and thus input character, image and/or the like on touchscreen panel 120.

With reference to FIG. 1(b), when the user finishes writing the answer in answer area Y of question 1, the user detaches stylus pen 190 from touchscreen panel 120. Electronic note 100 measures time elapsing since it no longer detects the nib of stylus pen 190.

In the present embodiment, electronic note 100 calculates reference coordinate data A indicating a center position of a rectangle surrounding a handwritten character input to answer area Y of question 1. Alternatively, electronic note 100 sets as reference coordinate data A contact position S of stylus pen 190 that is latest immediately before electronic note 100 no longer detects the nib of stylus pen 190. Alternatively, electronic note 100 sets a center position of answer area Y of question 1 as reference coordinate data A.

Electronic note 100 calculates reference coordinate data B indicating a center position of a rectangle surrounding contact position R of the palm obtained while the user is inputting a handwritten character to answer area Y of question 1. Alternatively, electronic note 100 sets as reference coordinate data B contact position R of the palm that is obtained immediately before electronic note 100 no longer detects the nib of stylus pen 190.

Electronic note 100 uses reference coordinate data A and reference coordinate data B to calculate a contact position of stylus pen 190 relative to that of the palm, or a relative position T. Electronic note 100 sets relative position T as reference coordinate data C.

With reference to FIG. 1(c), after electronic note 100 no longer detects the nib and subsequently once a predetermined period of time has elapsed electronic note 100 redisplays the content to allow question 2 to have its answer area Y with its center positioned away from the current contact position R of the palm by relative position T registered as reference coordinate data.

Thus according to the present embodiment electronic note 100 operates such that after the user finishes writing an answer in answer area Y of question 1 and subsequently once a predetermined period of time has elapsed electronic note 100 redisplays content, based on contact position R of the user's palm and contact position S of stylus pen 190, to allow question 2 to have its answer area automatically positioned under the current position of stylus pen 190. As a result, the user can scroll the content by a single question without a cumbersome operation apart from a handwritten input. In other words, improved operability can be achieved.

To implement such a function, electronic note 100 is specifically configured, as will be described hereinafter.

<Hardware Configuration of Electronic Note 100>

Figure 2:
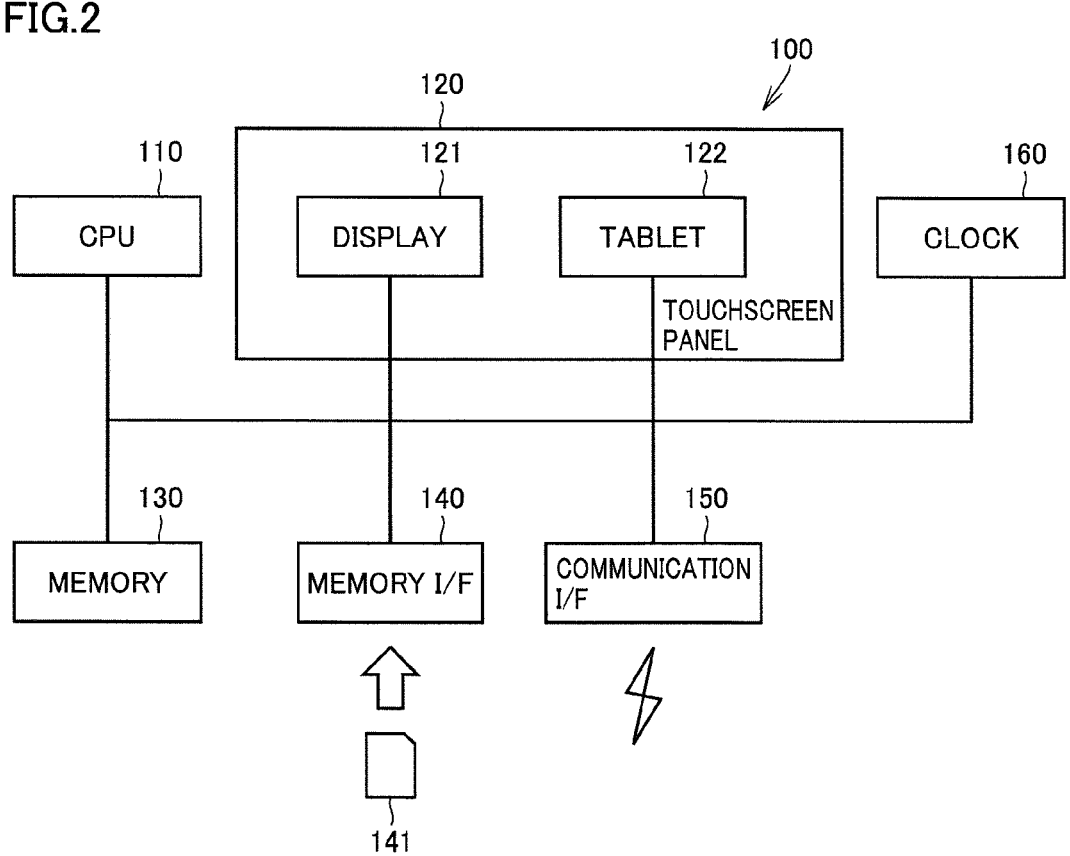
FIG. 2 is a block diagram representing a hardware configuration of electronic note 100 according to the present embodiment.

Electronic note 100 is specifically configured in one manner, as will be described hereinafter. FIG. 2 is a block diagram representing a hardware configuration of electronic note 100. With reference to FIG. 2, electronic note 100 includes a CPU 110, touchscreen panel 120, a memory 130, a memory interface 140, and a communication interface 150 as main components.

Touchscreen panel 120 includes a display 121 and a tablet 122. Touchscreen panel 120 may be any type of a resistance film system, a surface acoustic wave system, an infrared system, an electromagnetic induction system, and a capacitive sensing system, and the like. Touchscreen panel 120 may include optical sensor liquid crystal.

Touchscreen panel 120 detects an operation of touching touchscreen panel 120 by an external object whenever a predetermined time arrives, and touchscreen panel 120 accordingly inputs a contact position (or a contact coordinate) to CPU 110. Touchscreen panel 120 according to the present embodiment detects contact position S of stylus pen 190 and contact area Q of a palm or contact position R of the palm.

CPU 110 can thus obtain contact position S of stylus pen 190 and contact position R of the palm through touchscreen panel 120 successively. However, CPU 110 may calculate contact position S of stylus pen 190 and contact position R of the palm from image data generated from a sensor signal received from touchscreen panel 120.

Touchscreen panel 120 operates in response to an instruction (or signal) received from CPU 110 to display a character, an image and/or the like. CPU 110 transmits an instruction (or signal) to touchscreen panel 120 to cause touchscreen panel 120 to display a character, an image and/or the like.

Memory 130 is implemented as a variety of random access memory (RAM), read-only memory (ROM), a hard disk, and/or the like. Memory 130 stores a program executed by CPU 110, a variety of types of data as will be described later, and the like. CPU 110 controls each component of electronic note 100 by executing the program stored in memory 130.

Memory interface 140 reads data from an external storage medium 141. In other words, CPU 110 reads via memory interface 140 the data stored in external storage medium 141, and stores the data to memory 130. CPU 110 also reads data from memory 130 and stores the data to external storage medium 141 via memory interface 140.

Note that storage medium 141 includes compact disc-read only memory (CD-ROM), digital versatile disk-read only memory (DVD-ROM), universal serial bus (USB) memory, a memory card, a flexible disk (FD), a hard disk, magnetic tape, cassette tape, a magnetic optical disc (MO), a mini disc (MD), an integrated circuit (IC) card (excluding the memory card), an optical card, mask ROM, EPROM, electronically erasable programmable read-only memory (EEPROM), and a similar medium allowing a program to be stored therein in a non volatile manner.

Communication interface 150 is implemented as an antenna, a connector and/or the like. Communication interface 150 communicates data with another device via a cable or wirelessly. In other words, via communication interface 150, CPU 110 receives a program, image data, text data and the like from another device and transmits image data, text data and the like to another device.

A clock 160 transmits the current time to CPU 110. Clock 160 operates in response to an instruction received from CPU 110 to measure time elapsing since stylus pen 190 was detached from touchscreen panel 120.

CPU 110 controls each component of electronic note 100 by executing a program stored in memory 130 or storage medium 141. In other words, by executing the program stored in memory 130 or storage medium 141, CPU 110 implements the functional block shown in FIG. 3 and performs the process represented in FIGS. 4 and 5.

<Functional Configuration of Electronic Note 100>

Figure 3:
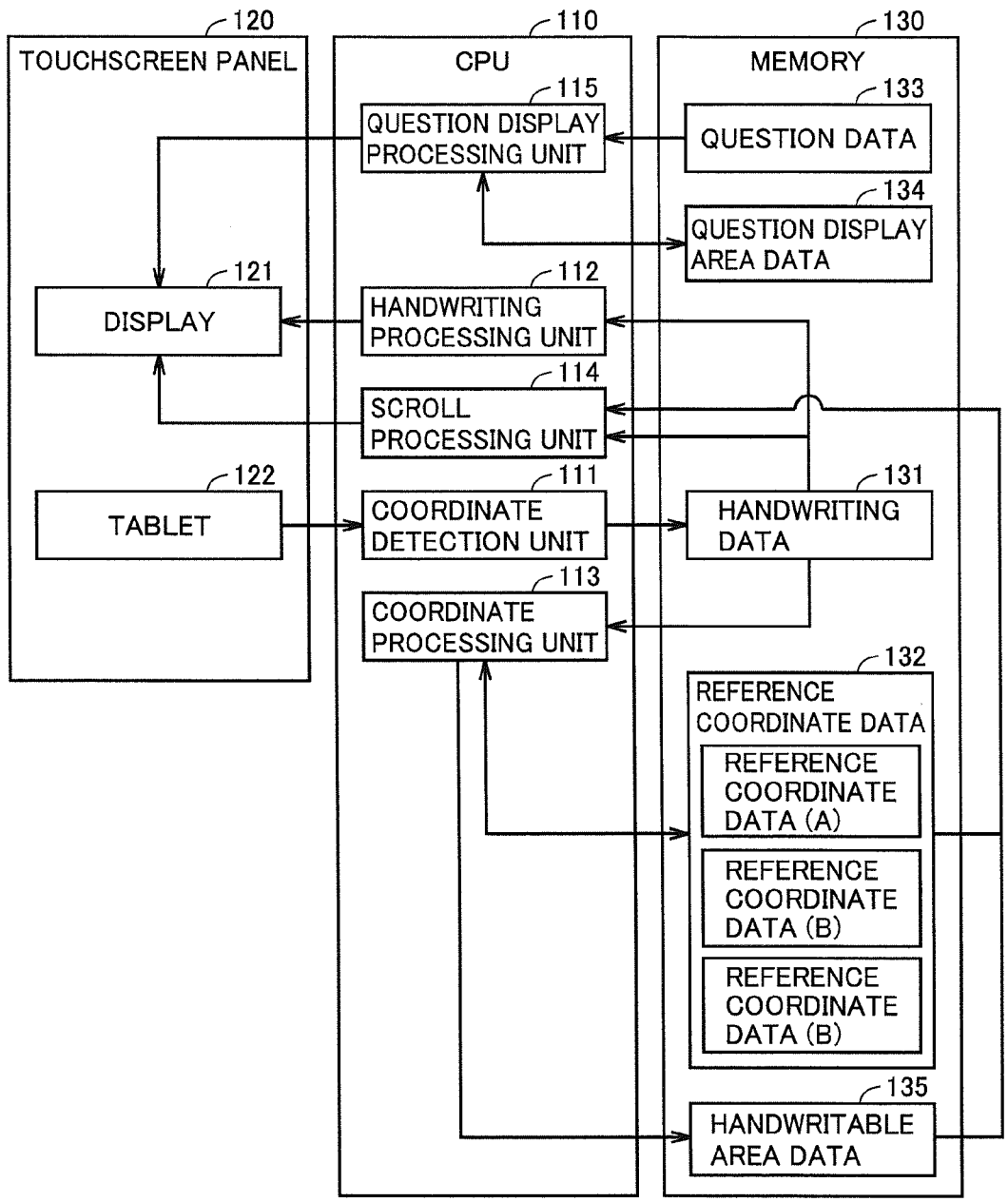
FIG. 3 is a block diagram representing a functional configuration of electronic note 100 according to a first embodiment.

Hereinafter will be described a functional configuration that electronic note 100 has. FIG. 3 is a block diagram representing a functional configuration of electronic note 100 according to the present embodiment.

With reference to FIG. 3, memory 130 initially stores time series data of contact position S of stylus pen 190 input via touchscreen panel 120 (or handwriting data 131). Memory 130 stores as reference coordinate data A the topmost, bottommost, rightmost, and leftmost coordinates of contact position S of stylus pen 190 for a question for which a handwritten character is input (hereinafter also referred to as a "target question") and a center coordinate of a rectangle having the topmost, bottommost, rightmost, and leftmost coordinates as vertices (i.e., a rectangle surrounding the handwritten character). Alternatively, memory 130 stores as reference coordinate data A a latest coordinate of contact position S of stylus pen 190 for the target question. Alternatively, memory 130 stores as reference coordinate data A a center position of answer area Y of the target question.

Memory 130 stores as reference coordinate data B the topmost, bottommost, rightmost, and leftmost coordinates of contact position R of the palm obtained while a handwritten input is done to the target question and a center coordinate of a rectangle having the topmost, bottommost, rightmost, and leftmost coordinates as vertices. Alternatively, memory 130 stores as reference coordinate data B a latest coordinate of contact position R of the palm obtained while a handwritten input is done to the target question.

Memory 130 stores a difference between reference coordinate data A and reference coordinate data B, or contact position S of stylus pen 190 relative to contact position R of the palm, i.e., relative position T, as reference coordinate data C.

Memory 130 has question data 133 (or content) including text, an image, and the like stored therein. Memory 130 includes question display area data 134 extracted from question data 133 for representing question area X for each question, and handwritable area data 135 extracted from question data 133 for representing answer area Y for each question. Question data 133 includes information indicating a center of answer area Y. Alternatively, the information indicating the center of answer area Y may be text data, image data or the like indicating answer area Y. In that case, CPU 110 calculates the center of answer area Y.

CPU 110 executes a program stored in memory 130 to implement a coordinate detection unit 111, a handwriting processing unit 112, a coordinate processing unit 113, a scroll processing unit 114 and a question display processing unit 115.

Note that in the present embodiment coordinate detection unit 111, handwriting processing unit 112, coordinate processing unit 113, scroll processing unit 114, and question display processing unit 115 are a software module implemented by CPU 110 executing the program. However, coordinate detection unit 111, handwriting processing unit 112, coordinate processing unit 113, scroll processing unit 114, and question display processing unit 115 may be implemented by dedicated hardware circuitry.

Initially, coordinate detection unit 111 obtains a contact position of an external object on touchscreen panel 120, as based on a signal received from tablet 122. Coordinate detection unit 111 stores contact position S, as obtained, of stylus pen 190 to memory 130 successively as time series data (or handwriting data 131). Coordinate detection unit 111 may associate a coordinate of a handwritten image with the type of the pen selected, and store the association to memory 130. Furthermore, coordinate detection unit 111 stores the centroid of contact area Q, as based on contact area Q of the palm as obtained, to memory 130 as contact position R of the palm.

Handwriting processing unit 112 causes touchscreen panel 120 to display a locus of the contact position, as based on handwriting data 131. Thus when the contact position has a locus representing a character, graphics and/or the like, the user can recognize the character, graphics and/or the like displayed on touchscreen panel 120. When the screen is scrolled (or a position at which content is displayed is changed) as will be described hereinafter, handwriting processing unit 112 moves the locus of the contact position, or a handwritten character, to accommodate the amount scrolled and thus displays it (i.e., moves it in parallel).

Coordinate processing unit 113 refers to handwritable area data 135 to store contact position S of stylus pen 190, i.e., handwriting data 131 that coordinate detection unit 111 has obtained, that is located in answer area Y as handwriting data 131 to memory 130, and to delete (or ignore) contact position S of stylus pen 190, i.e., handwriting data 131 that coordinate detection unit 111 has obtained, that is located outside answer area Y.

Coordinate processing unit 113 updates reference coordinate data A stored in memory 130, as based on contact position S of stylus pen 190. More specifically, coordinate processing unit 113 updates the topmost, bottommost, rightmost, and leftmost coordinates of contact position S of stylus pen 190 for a question for which a handwritten character is input (or a target question) and a center coordinate of a rectangle having the topmost, bottommost, rightmost, and leftmost coordinates as vertices (i.e., a rectangle surrounding the handwritten character). Alternatively, coordinate processing unit 113 updates a latest coordinate of contact position S of stylus pen 190 for the target question. Alternatively, coordinate processing unit 113 updates a center position of answer area Y of the target question.

Coordinate processing unit 113 updates reference coordinate data B stored in memory 130, as based on contact position R of the palm. More specifically, coordinate processing unit 113 updates the topmost, bottommost, rightmost, and leftmost coordinates of contact position R of the palm obtained while a handwritten input is done to the target question and a center coordinate of a rectangle having the topmost, bottommost, rightmost, and leftmost coordinates as vertices. Alternatively, coordinate processing unit 113 updates a latest coordinate of contact position R of the palm obtained while a handwritten input is done to the target question.

Coordinate processing unit 113 updates reference coordinate data C stored in memory 130. More specifically, coordinate processing unit 113 uses reference coordinate data A and reference coordinate data B to update contact position S of stylus pen 190 relative to contact position R of the palm, i.e., relative position T.

Scroll processing unit 114 refers to clock 160 to obtain therefrom time elapsing since coordinate detection unit 111 no longer detects contact position S of stylus pen 190. Time thus elapses, and once it has reached a predetermined time, scroll processing unit 114 determines a position to display the content such that a next question's answer area Y has its center positioned away from the latest (or current) contact position R of the palm by relative position T based on reference coordinate data C. For example, scroll processing unit 114 determines an amount of scrolling the content displayed.

More specifically, scroll processing unit 114 determines the amount to be scrolled, as follows: once contact position S of stylus pen 190 detected in answer area Y of question 1 has no longer been detected, then a predetermined period of time is awaited and thereafter answer area Y of a next question (or question 2) moves to a position away from the current contact position R of the palm by relative position T. Note, however, that scroll processing unit 114 may determine the amount to be scrolled only in the y direction to allow the next question's answer area Y to have its center with a y coordinate matching that of relative position T from the current contact position R of the palm.

Question display processing unit 115 redisplays the content, based on question data 133, when scroll processing unit 114 determines that time has elapsed and reached the predetermined time. For example, once contact position S of stylus pen 190 detected in answer area Y of question 1 has no longer been detected, then question display processing unit 115 refers to question data 133 to redisplay the content so that the next question's answer area Y has its center matching relative position T from the current contact position R of the palm. Note, however, that question display processing unit 115 may redisplay the content to allow the next question's answer area Y to have its center with a y coordinate matching that of relative position T from the current contact position R of the palm.

Note that preferably question display processing unit 115 refers to question display area data 134 and handwritable area data 135 to cause touchscreen panel 120 to display content to display the next question's (or question 2's) question area X and answer area Y altogether on touchscreen panel 120. In other words, question display processing unit 115 causes touchscreen panel 120 to display the content such that the next question's (or question 2's) question area X and answer area Y are accommodated on touchscreen panel 120 in a display area.

<Content Display Process>

Figure 4:
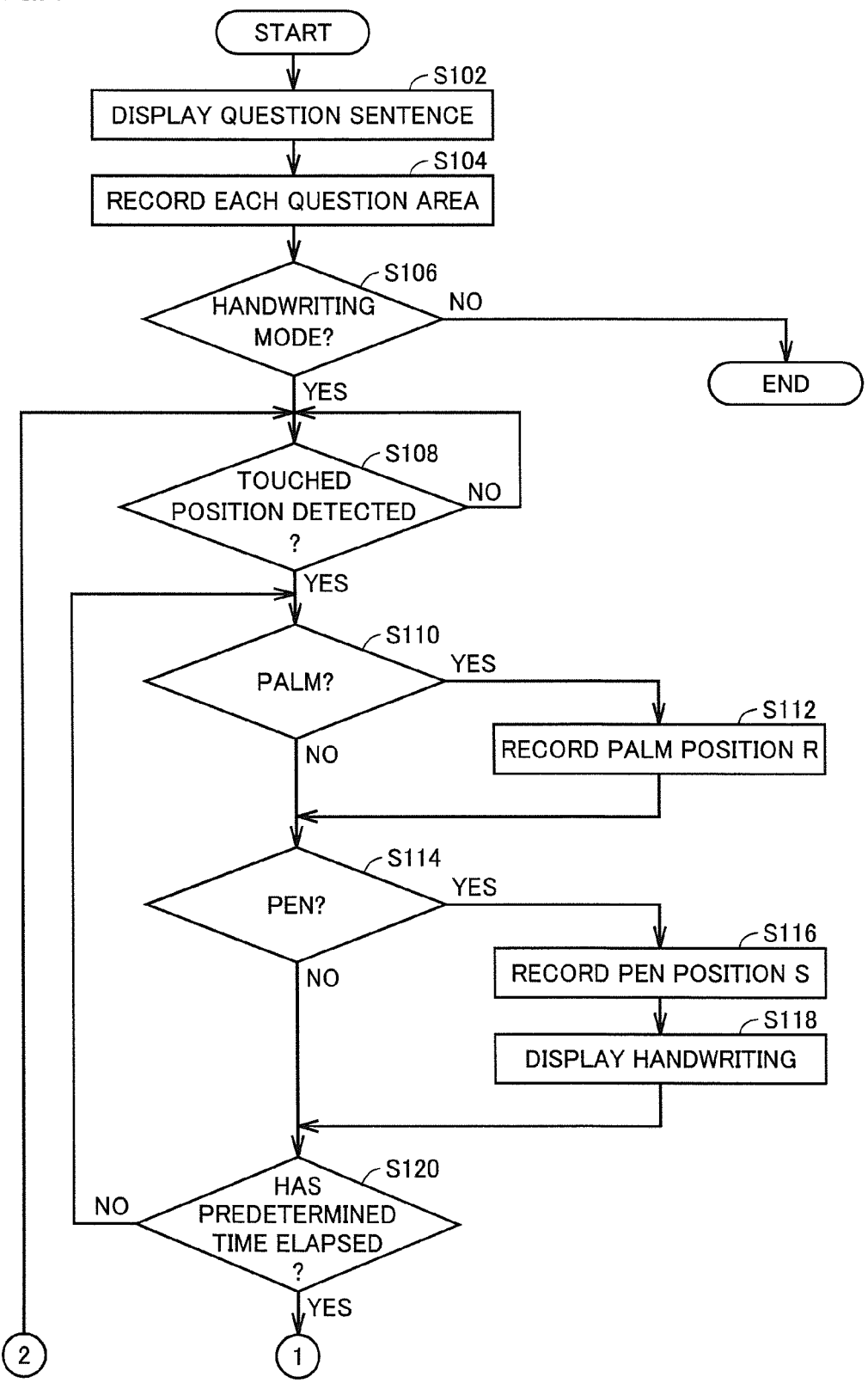
FIG. 4 is a first flowchart of a content display process according to the first embodiment.
Figure 5:
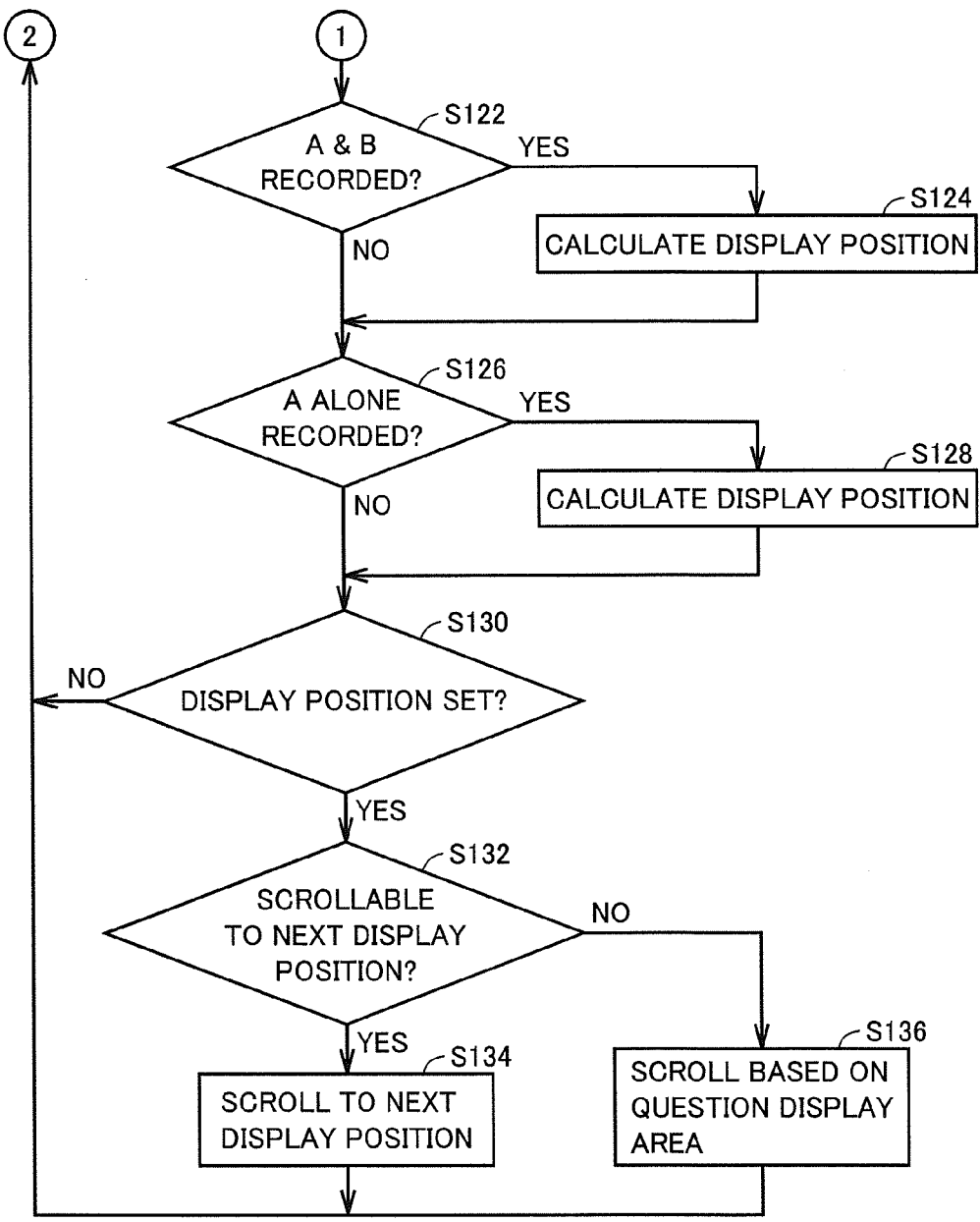
FIG. 5 is a second flowchart of the content display process according to the first embodiment.

CPU 110 according to the present embodiment performs a content display process, as will be described hereinafter. FIG. 4 is a first flowchart of the content display process according to the first embodiment. FIG. 5 is a second flowchart of the content display process according to the first embodiment.

With reference to FIG. 4 and FIG. 5, CPU 110 reads question data 133 from memory 130, and causes touchscreen panel 120 to display question 1 (or the target question) entirely, question 2 entirely, and a question 3 partially thereon (Step S102). CPU 110 stores question display area data 134 and handwritable area data 135, based on the question data, to memory 130 for each question (Step S104).

CPU 110 determines whether a handwriting mode is selected (Step S106). For example, CPU 110 determines which one is selected from a mode allowing stylus pen 190 or the like to be used to handwrite and thus input a character, a mode allowing a software button to be used to input a character, and a mode allowing a hardware button to be used to input a character.

If the handwriting mode is not selected (NO in Step S106), CPU 110 ends the content display process. In that case, a screen is scrolled in accordance with a normal scroll instruction, for example.

If the handwriting mode is selected (YES in Step S106), CPU 110 detects a contact position via touchscreen panel 120. If no contact position can be detected (NO in Step S108) CPU 110 repeats Step S108.

If any contact position can be detected (YES in Step S108), then from that contact position's area (or how many pixels it has), pressure and/or the like CPU 110 determines whether a palm is in contact with touchscreen panel 120 (Step S110). If no palm is in contact with touchscreen panel 120 (NO in Step S110) CPU 110 performs Step S114 et seq.

If a palm is in contact with touchscreen panel 120 (YES in Step S110) CPU 110 stores contact position R of the palm to memory 130 as reference coordinate data B (Step S112). More specifically, CPU 110 calculates contact position R of the palm based on contact area Q obtained from touchscreen panel 120.

CPU 110 determines whether stylus pen 190 is in contact with touchscreen panel 120 (Step S114). If stylus pen 190 is in contact with touchscreen panel 120 (YES in Step S114), CPU 110 stores contact position S of stylus pen 190 to memory 130 as reference coordinate data A (Step S116).

CPU 110 causes touchscreen panel 120 to vary a manner of displaying a position corresponding to contact position S of stylus pen 190 (e.g., brightness) (Step S118). More specifically, CPU 110 stores contact position S of stylus pen 190 to memory 130 as handwriting data 131. Then, CPU 110 causes touchscreen panel 120 to display an input handwritten character along handwriting data 131 (or a locus of contact position S of stylus pen 190). CPU 110 performs step S120 et seq.

If stylus pen 190 is not in contact with touchscreen panel 120 (NO in Step S114), CPU 110 refers to clock 160 to determine whether a predetermined period of time has elapsed since contact position S of stylus pen 190 was no longer detected (Step S120). If the predetermined period of time has not yet elapsed since contact position S of stylus pen 190 was no longer detected (NO in Step S120) CPU 110 repeats step S110 et seq.

If the predetermined period of time has elapsed since contact position S of stylus pen 190 was no longer detected (YES in Step S120), CPU 110 determines whether reference coordinate data A and reference coordinate data B are stored in memory 130 (Step S122). Alternatively, CPU 110 determines whether reference coordinate data C is stored in memory 130. If either reference coordinate data A or reference coordinate data B is not stored in memory 130 (NO in Step S122), CPU 110 performs step S126 et seq.

If reference coordinate data A and reference coordinate data B are stored in memory 130 (YES in Step S122), CPU 110 calculates a position at which the next question's (or question 2's) answer area Y should be displayed (Step S124). More specifically, CPU 110 uses reference coordinate data C to calculate a position away from the current contact position R of the palm by relative position T.

CPU 110 determines whether reference coordinate data A is alone stored in memory 130 (Step S126). In other words, CPU 110 determines whether reference coordinate data A has a coordinate value stored therein and reference coordinate data B has NULL stored therein. If reference coordinate data A is not alone stored in memory 130 (NO in Step S126), CPU 110 performs step S130 et seq.

If reference coordinate data A is alone stored in memory 130 (YES in Step S126), CPU 110 calculates a position at which the next question's answer area Y should be displayed (Step S128). More specifically, CPU 110 sets based on reference coordinate data A as a position at which answer area Y should be displayed a center position of a rectangle surrounding a handwritten character input to answer area Y of question 1 or contact position S of stylus pen 190 that is latest immediately before the nib of stylus pen 190 is no longer detected.

CPU 110 determines whether a position is set at which the next question's answer area Y should be displayed (Step S130). If a position is not set at which the next question's answer area Y should be displayed (NO in Step S130) CPU 110 repeats step S108 et seq.

If a position is set at which the next question's answer area Y should be displayed (YES in Step S130) CPU 110 tries to match a center W2 of answer area Y of question 2 to the position at which the next answer area Y should be displayed. With question 2 having its answer area Y with center W2 matched to the position at which the next answer area Y should be displayed, CPU 110 determines whether question 2 has its question area X and answer area Y both entirely accommodated on touchscreen panel 120 in the display area (Step S132).

If question 2 having its answer area Y with center W2 matched to the position at which the next answer area Y should be displayed has its question area X and answer area Y both entirely accommodated on touchscreen panel 120 in the display area (YES in Step S132), CPU 110 scrolls the screen so that question 2 has its answer area Y with center W2 matched to the position at which the next answer area Y should be displayed (Step S134). CPU 110 repeats step S108 et seq.

If question 2 having its answer area Y with center W2 matched to the position at which the next answer area Y should be displayed fails to have its question area X and answer area Y both entirely accommodated on touchscreen panel 120 in the display area (NO in Step S132), CPU 110 scrolls the screen so that question 2 has its question area X and answer area Y accommodated on touchscreen panel 120 in the display area (Step S136). For example, CPU 110 scrolls the screen to allow question 2 to have an upper end displayed at that of touchscreen panel 120. CPU 110 repeats step S108 et seq.

Second Embodiment

In the first embodiment, a position to display content is determined based on contact position R of a palm and contact position S of stylus pen 190. However, electronic note 100 may determine a position to display content, based on contact position R of the palm and relative position T as predetermined, irrespective of contact position S of stylus pen 190. In the present embodiment, relative position T is set previously.

Hereinafter will be described as a second embodiment a configuration of electronic note 100 displaying content based on contact position R of a palm irrespective of contact position S of stylus pen 190. Note that no description will be repeated for any configuration similar to that of electronic note 100 according to the first embodiment.

<Outlining how Electronic Note 100 Operates>

Figure 6:
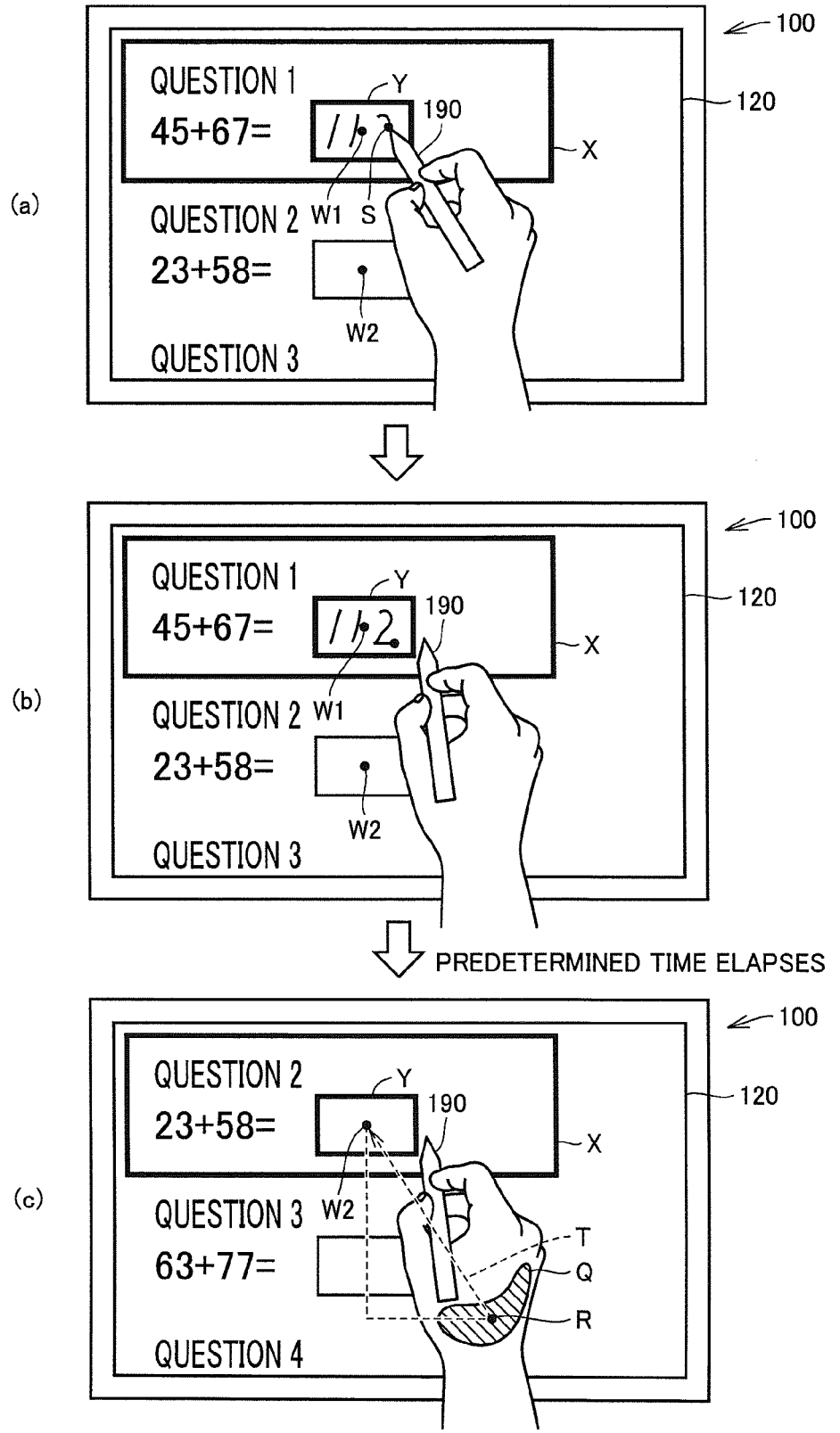
FIG. 6 outlines how electronic note 100 operates according to a second embodiment.

Initially will be outlined how electronic note 100 operates according to the second embodiment. FIG. 6 outlines how electronic note 100 operates according to the second embodiment.

More specifically, FIG. 6(a) shows a user handwriting and thus inputting characters with stylus pen 190 with his/her palm in contact with touchscreen panel 120. FIG. 6(b) shows the user having detached stylus pen 190 from touchscreen panel 120. FIG. 6(c) shows electronic note 100 after stylus pen 190 is detached from touchscreen panel 120 when a predetermined period of time elapses.

With reference to FIGS. 6(a) to 6(c), touchscreen panel 120 of electronic note 100 displays content such as text, image and/or the like. Herein, the content includes a plurality of questions and answer area Y associated with each of the questions. In the content, question area X and answer area Y are set for each question. Answer area Y may be included in question area X, or may be provided independently of question area X.

The content has stored information therein for determining a position for answer area Y for each question. For example, the content has stored therein information indicating a center position, an upper left end and/or the like of answer area Y for each question. Alternatively, text data, image data and/or the like for indicating answer area Y may per se be information indicating a position of the answer area. In other words, electronic note 100 may display a center of answer area Y or answer area Y at a preferable position based on the text data, image data and/or the like for indicating answer area Y.

Note that electronic note 100 according to the present embodiment receives an input handwritten in answer area Y and does not receive an input handwritten outside answer area Y.

With reference to FIG. 6(a), the user with reference to question 1 handwrites and thus inputs an answer to answer area Y of question 1. Electronic note 100 successively obtains contact position S on touchscreen panel 120 at which stylus pen 190 is in contact with touchscreen panel 120, and electronic note 100 accordingly displays a handwritten and thus input character, image and/or the like on touchscreen panel 120.

With reference to FIG. 6(b), when the user finishes writing the answer in answer area Y of question 1, the user detaches stylus pen 190 from touchscreen panel 120. Electronic note 100 measures time elapsing since it no longer detects the nib of stylus pen 190.

Note that, in the present embodiment, electronic note 100 does not need to obtain reference coordinate data A and reference coordinate data B.

With reference to FIG. 6(c), after electronic note 100 no longer detects the nib and subsequently once a predetermined period of time has elapsed electronic note 100 redisplays the content to allow question 2 to have its answer area Y with its center positioned away from the latest (or current) contact position R of the palm by relative position T as predetermined.

Thus according to the present embodiment electronic note 100 operates such that after the user finishes writing an answer in answer area Y of question 1 and subsequently once a predetermined period of time has elapsed electronic note 100 redisplays content, based on the position of the user's palm, to allow question 2 to have its answer area automatically positioned under stylus pen 190. As a result, the user can scroll the content by a single question without a cumbersome operation apart from a handwritten input. In other words, improved operability can be achieved.

Note that electronic note 100 according to the present embodiment has a hardware configuration that is similar to that of the first embodiment, and accordingly will not be described repeatedly.

<Functional Configuration of Electronic Note 100>

Figure 7:
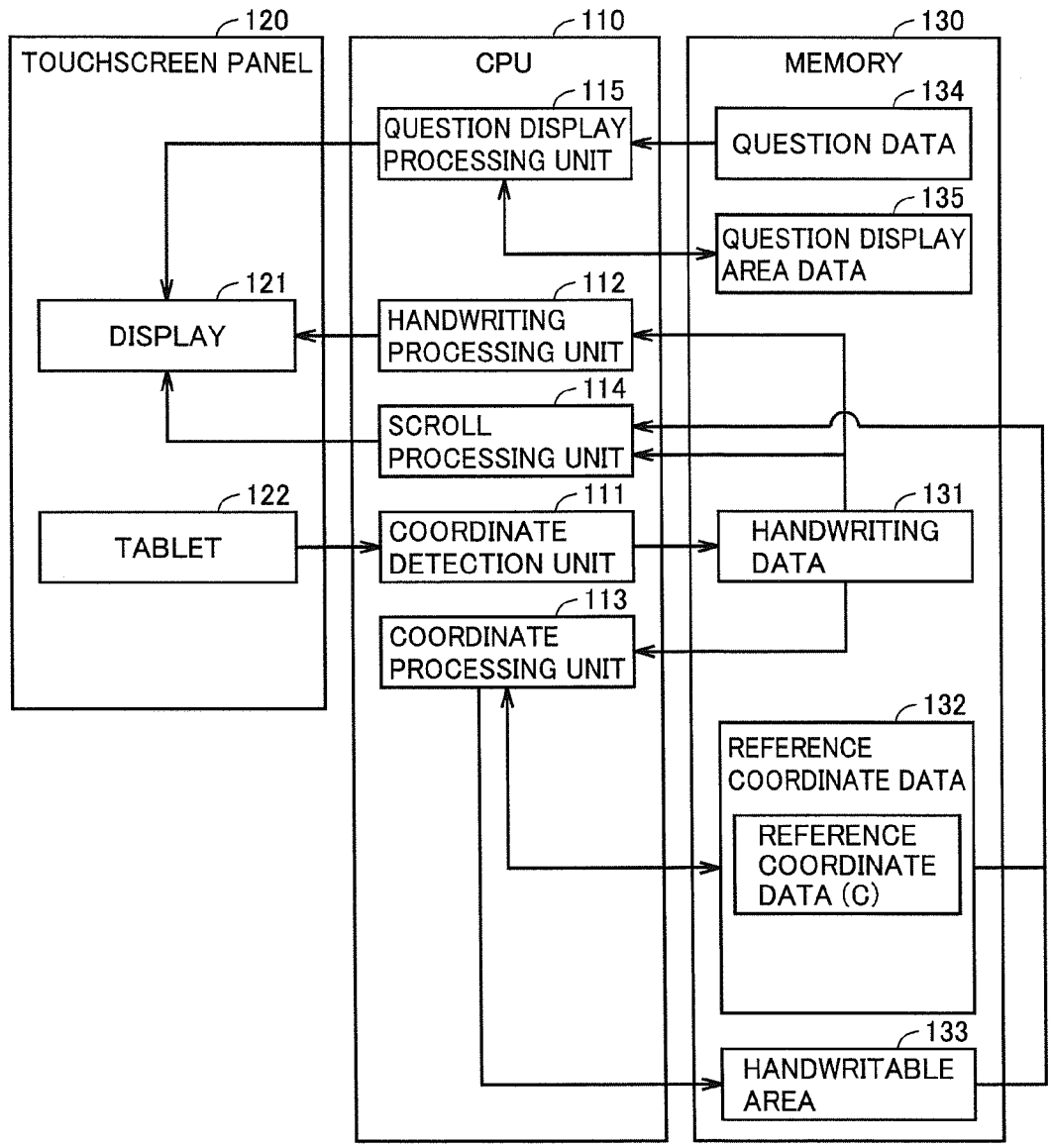
FIG. 7 is a block diagram representing a functional configuration of electronic note 100 according to the second embodiment.

Hereinafter will be described a functional configuration that electronic note 100 has. FIG. 7 is a block diagram representing a functional configuration of electronic note 100 according to the present embodiment.

With reference to FIG. 7, when memory 130 according to the present embodiment is compared with memory 130 of the first embodiment, the former is different from the latter in that the former is not required to store reference coordinate data A and reference coordinate data B and that the former has reference coordinate data C previously set therein. The other data is similar to that of the first embodiment, and accordingly, will not be described herein repeatedly.

CPU 110 executes a program stored in memory 130 to implement coordinate detection unit 111, handwriting processing unit 112, coordinate processing unit 113, scroll processing unit 114 and question display processing unit 115.

Note that in the present embodiment coordinate detection unit 111, handwriting processing unit 112, coordinate processing unit 113, scroll processing unit 114, and question display processing unit 115 are a software module implemented by CPU 110 executing the program. However, coordinate detection unit 111, handwriting processing unit 112, coordinate processing unit 113, scroll processing unit 114 and question display processing unit 115 may be implemented by dedicated hardware circuitry.

Coordinate detection unit 111 and handwriting processing unit 112 are similar to those of the first embodiment, and accordingly, will not be described herein repeatedly.

Coordinate processing unit 113 refers to handwritable area data 135 to store contact position S of stylus pen 190, i.e., handwriting data 131 that coordinate detection unit 111 has obtained, that is located in answer area Y as handwriting data 131 to memory 130, and to delete (or ignore) contact position S of stylus pen 190, i.e., handwriting data 131 that coordinate detection unit 111 has obtained, that is located outside answer area Y.

Scroll processing unit 114 refers to clock 160 to obtain therefrom time elapsing since coordinate detection unit 111 no longer detects contact position S of stylus pen 190. Time thus elapses, and once it has reached a predetermined time, scroll processing unit 114 determines a position to display the content, as based on reference coordinate data C, such that a next question's answer area Y has its center positioned away from the latest (or current) contact position R of the palm by relative position T as predetermined. For example, scroll processing unit 114 determines an amount of scrolling the content displayed.

More specifically, scroll processing unit 114 determines the amount to be scrolled, as follows: once contact position S of stylus pen 190 detected in answer area Y of question 1 has no longer been detected, then a predetermined period of time is awaited and thereafter answer area Y of a next question (or question 2) moves to a position away from the current contact position R of the palm by relative position T as predetermined. Note, however, that scroll processing unit 114 may determine the amount to be scrolled only in the y direction to allow the next question's answer area Y to have its center with a y coordinate matching that of relative position T from the current contact position R of the palm.

Question display processing unit 115 redisplays the content, based on question data 133, when scroll processing unit 114 determines that time has elapsed and reached the predetermined time. For example, once contact position S of stylus pen 190 detected in answer area Y of question 1 has no longer been detected, then question display processing unit 115 refers to question data 133 to redisplay the content so that the next question has its answer area Y matching relative position T that is predetermined from the current contact position R of the palm. Note, however, that question display processing unit 115 may redisplay the content to allow the next question's answer area Y to have its center with a y coordinate matching that of relative position T from the current contact position R of the palm.

Note that preferably question display processing unit 115 refers to question display area data 134 and handwritable area data 135 to cause touchscreen panel 120 to display content to display the next question's (or question 2's) question area X and answer area Y altogether on touchscreen panel 120. In other words, question display processing unit 115 causes touchscreen panel 120 to display the content such that the next question's (or question 2's) question area X and answer area Y are accommodated on touchscreen panel 120 in the display area.

<Content Display Process>

Figure 8:
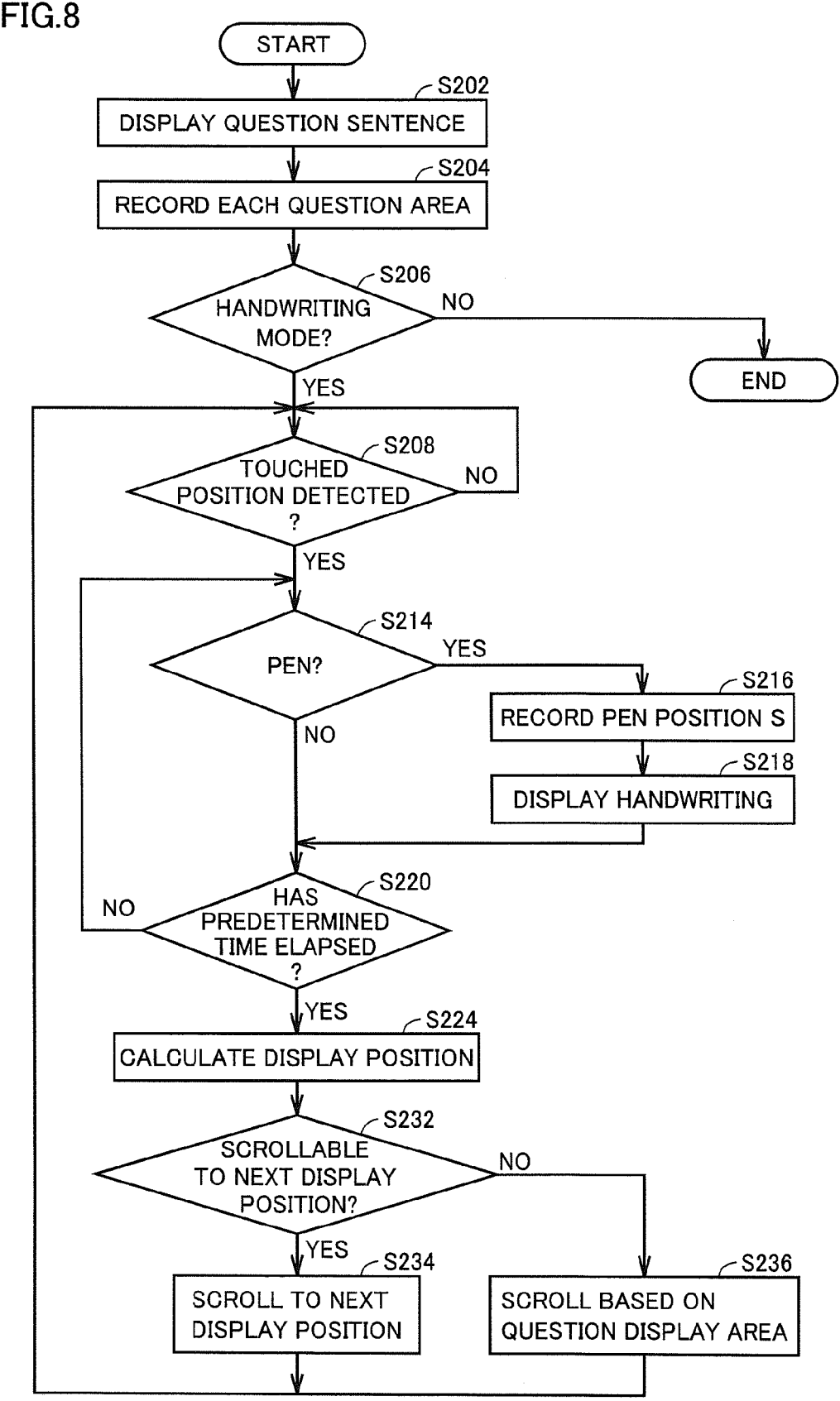
FIG. 8 is a flowchart of a content display process according to the second embodiment.

CPU 110 according to the present embodiment performs a content display process, as will be described hereinafter. FIG. 8 is a flowchart of a content display process according to the second embodiment.

With reference to FIG. 8, CPU 110 reads question data 133 from memory 130, and causes touchscreen panel 120 to display question 1 entirely, question 2 entirely, and question 3 partially thereon (Step S202). CPU 110 stores question display area data 134 and handwritable area data 135, based on the question data, to memory 130 for each question (Step S204).

CPU 110 determines whether a handwriting mode is selected (Step S206). For example, CPU 110 determines which one is selected from a mode allowing stylus pen 190 or the like to be used to handwrite and thus input a character, a mode allowing a software button to be used to input a character, and a mode allowing a hardware button to be used to input a character.

If the handwriting mode is not selected (NO in Step S206), CPU 110 ends the content display process. In that case, a screen is scrolled in accordance with a normal scroll instruction, for example.

If the handwriting mode is selected (YES in Step S206), CPU 110 detects a contact position via touchscreen panel 120. If no contact position can be detected (NO in Step S208) CPU 110 repeats Step S208.

If any contact position can be detected (YES in Step S208), CPU 110 determines whether stylus pen 190 is in contact with touchscreen panel 120 (Step S214). If stylus pen 190 is in contact with touchscreen panel 120 (YES in Step S214), CPU 110 stores contact position S of stylus pen 190 to memory 130 as reference coordinate data A (Step S216).

CPU 110 causes touchscreen panel 120 to vary a manner of displaying a position corresponding to contact position S of stylus pen 190 (e.g., brightness) (Step S218). More specifically, CPU 110 stores contact position S of stylus pen 190 to memory 130 as handwriting data 131. Then, CPU 110 causes touchscreen panel 120 to display an input handwritten character along handwriting data 131 (or a locus of contact position S of stylus pen 190). CPU 110 performs step S220 et seq.

If stylus pen 190 is not in contact with touchscreen panel 120 (NO in Step S214), CPU 110 refers to clock 160 to determine whether a predetermined period of time has elapsed since contact position S of stylus pen 190 was no longer detected (Step S220). If the predetermined period of time has not yet elapsed since contact position S of stylus pen 190 was no longer detected (NO in Step S220) CPU 110 repeats step S214 et seq.

If the predetermined period of time has elapsed since contact position S of stylus pen 190 was no longer detected (YES in Step S220), CPU 110 calculates a position at which a next question's (or question 2's) answer area Y should be displayed (Step S224). More specifically, CPU 110 uses reference coordinate data C to calculate a position away from the current contact position R of the palm by relative position T as predetermined.

CPU 110 tries to match center W2 of answer area Y of question 2 to the position at which the next answer area Y should be displayed. With question 2 having its answer area Y with center W2 matched to the position at which the next answer area Y should be displayed, CPU 110 determines whether question 2 has its question area X and answer area Y both entirely accommodated on touchscreen panel 120 in the display area.

If question 2 having its answer area Y with center W2 matched to the position at which the next answer area Y should be displayed has its question area X and answer area Y both entirely accommodated on touchscreen panel 120 in the display area (YES in Step S232), CPU 110 scrolls the screen so that question 2 has its answer area Y with center W2 matched to the position at which the next answer area Y should be displayed (Step S234). CPU 110 repeats step S208 et seq.

If question 2 having its answer area Y with center W2 matched to the position at which the next answer area Y should be displayed fails to have its question area X and answer area Y both entirely accommodated on touchscreen panel 120 in the display area (NO in Step S232), CPU 110 scrolls the screen so that question 2 has its question area X and answer area Y accommodated on touchscreen panel 120 in the display area (Step S236). For example, CPU 110 scrolls the screen to allow question 2 to have an upper end displayed at that of touchscreen panel 120. CPU 110 repeats step S208 et seq.

Third Embodiment

In the first embodiment, a position to display content is determined based on contact position R of a palm and contact position S of stylus pen 190. However, electronic note 100 may determine a position to display content, based on contact position S of stylus pen 190, irrespective of contact position R of the palm.

Hereinafter will be described as a third embodiment a configuration of electronic note 100 displaying content, based on contact position S of stylus pen 190, irrespective of contact position R of the palm. Note that no description will be repeated for any configuration similar to that of electronic note 100 according to the first embodiment.

<Outlining how Electronic Note 100 Operates>

Figure 9:
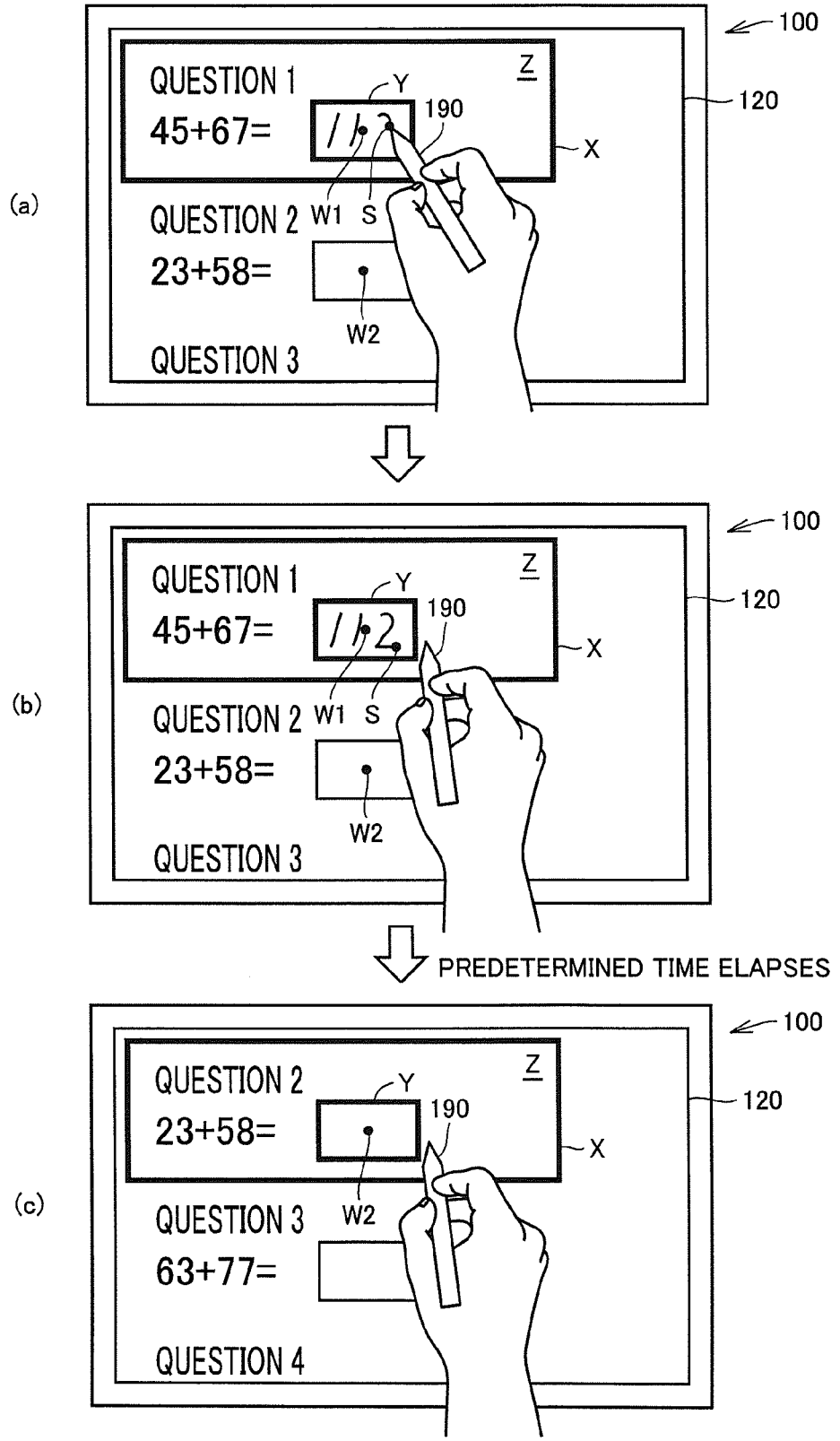
FIG. 9 outlines how electronic note 100 operates according to a third embodiment.

Initially will be outlined how electronic note 100 operates according to the third embodiment. FIG. 9 outlines how electronic note 100 operates according to the third embodiment.

More specifically, FIG. 9(a) shows a user handwriting and thus inputting characters with stylus pen 190. FIG. 9(b) shows the user having detached stylus pen 190 from touchscreen panel 120. FIG. 9(c) shows electronic note 100 after stylus pen 190 is detached from touchscreen panel 120 when a predetermined period of time elapses.

With reference to FIGS. 9(a) to 9(c), touchscreen panel 120 of electronic note 100 displays content such as text, image and/or the like. Herein, the content includes a plurality of questions and answer area Y associated with each of the questions. In the content, question area X and answer area Y are set for each question. Answer area Y may be included in question area X, or may be provided independently of question area X.

The content has stored information therein for determining a position for answer area Y for each question. For example, the content has stored therein information indicating a center position, an upper left end and/or the like of answer area Y for each question. Alternatively, text data, image data and/or the like for indicating answer area Y may per se be information indicating a position of the answer area. In other words, electronic note 100 may display a center of answer area Y or answer area Y at a preferable position based on the text data, image data and/or the like for indicating answer area Y.

Note that electronic note 100 according to the present embodiment receives an input handwritten in answer area Y and does not receive an input handwritten outside answer area Y.

With reference to FIG. 9(a), the user with reference to question 1 handwrites and thus inputs an answer to answer area Y of question 1. Electronic note 100 successively obtains contact position S on touchscreen panel 120 at which stylus pen 190 (or a finger of the user or the like) is in contact with touchscreen panel 120, and electronic note 100 accordingly displays a handwritten and thus input character, image and/or the like on touchscreen panel 120.

With reference to FIG. 9(b), when the user finishes writing the answer in answer area Y of question 1, the user detaches stylus pen 190 from touchscreen panel 120. Electronic note 100 measures time elapsing since it no longer detects the nib of stylus pen 190.

Electronic note 100 calculates reference coordinate data A indicating a center position of a rectangle surrounding a handwritten character input to answer area Y of question 1. Alternatively, electronic note 100 sets as reference coordinate data A contact position S of stylus pen 190 that is latest immediately before electronic note 100 no longer detects the nib of stylus pen 190. Alternatively, electronic note 100 sets a center position of answer area Y of question 1 as reference coordinate data A.

With reference to FIG. 9(c), after electronic note 100 no longer detects the nib and subsequently once a predetermined period of time has elapsed electronic note 100 redisplays the content to allow question 2 to have its answer area Y with its center positioned as indicated by reference coordinate data A.

Thus according to the present embodiment electronic note 100 operates such that after the user finishes writing an answer in answer area Y of question 1 and subsequently once a predetermined period of time has elapsed electronic note 100 redisplays content, based on contact position S of stylus pen 190, to allow question 2 to have its answer area automatically positioned under stylus pen 190. As a result, the user can scroll the content by a single question without a cumbersome operation apart from a handwritten input. In other words, improved operability can be achieved.

Note that electronic note 100 according to the present embodiment has a hardware configuration that is similar to that of the first embodiment, and accordingly will not be described repeatedly.

<Functional Configuration of Electronic Note 100>

Figure 10:
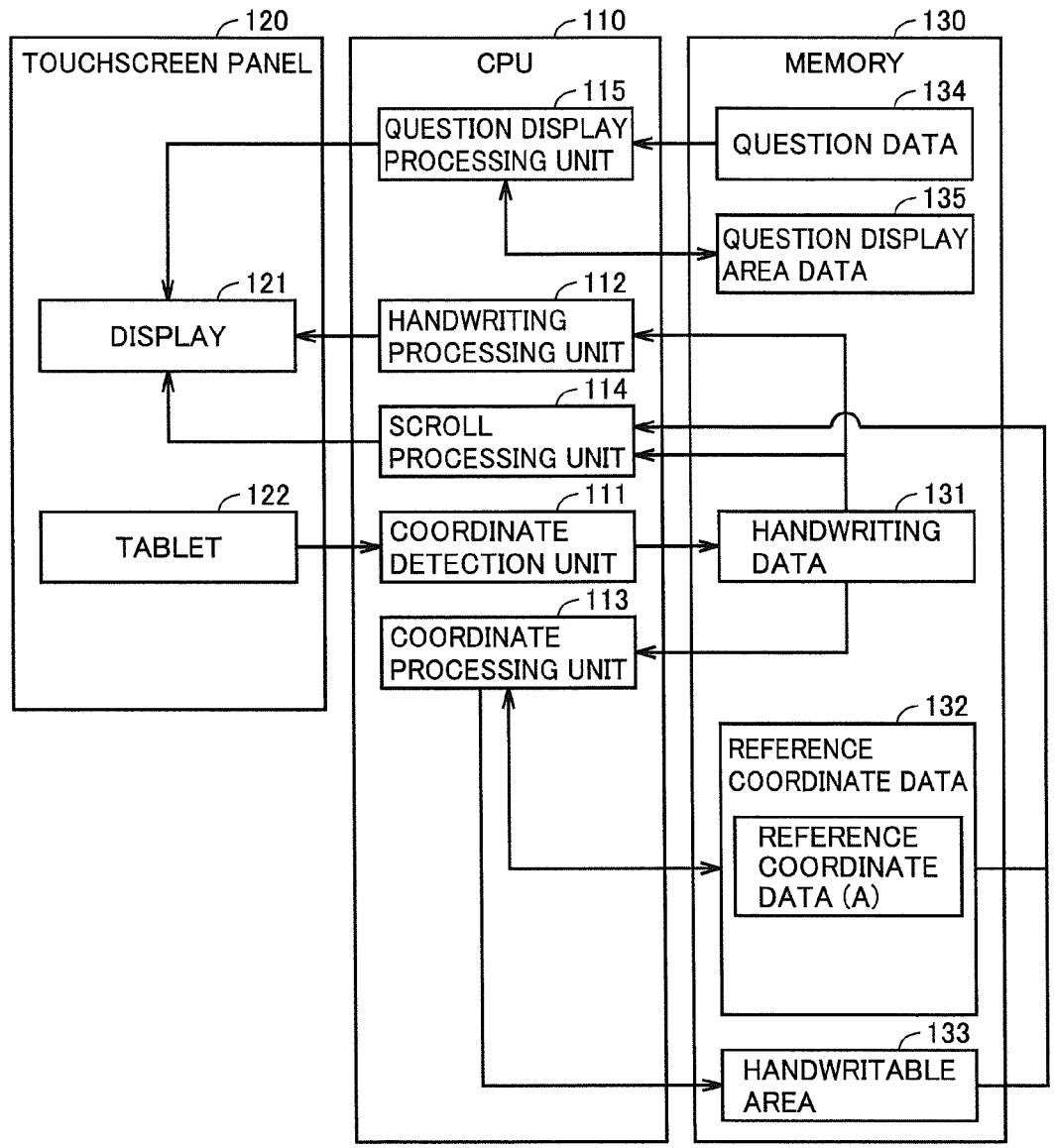
FIG. 10 is a block diagram representing a functional configuration of electronic note 100 according to the third embodiment.

Hereinafter will be described a functional configuration that electronic note 100 has. FIG. 10 is a block diagram representing a functional configuration of electronic note 100 according to the present embodiment.

With reference to FIG. 10, when memory 130 according to the present embodiment is compared with memory 130 of the first embodiment, the former is different from the latter in that the former is not required to store reference coordinate data B and reference coordinate data C. The other data is similar to that of the first embodiment, and accordingly, will not be described herein repeatedly.

CPU 110 executes a program stored in memory 130 to implement coordinate detection unit 111, handwriting processing unit 112, coordinate processing unit 113, scroll processing unit 114 and question display processing unit 115.

Note that in the present embodiment coordinate detection unit 111, handwriting processing unit 112, coordinate processing unit 113, scroll processing unit 114, and question display processing unit 115 are a software module implemented by CPU 110 executing the program. However, coordinate detection unit 111, handwriting processing unit 112, coordinate processing unit 113, scroll processing unit 114 and question display processing unit 115 may be implemented by dedicated hardware circuitry.

Coordinate detection unit 111 and handwriting processing unit 112 are similar to those of the first embodiment, and accordingly, will not be described herein repeatedly.

Coordinate processing unit 113 refers to handwritable area data 135 to store contact position S of stylus pen 190, i.e., handwriting data 131 that coordinate detection unit 111 has obtained, that is located in answer area Y as handwriting data 131 to memory 130, and to delete (or ignore) contact position S of stylus pen 190, i.e., handwriting data 131 that coordinate detection unit 111 has obtained, that is located outside answer area Y.

Coordinate processing unit 113 updates reference coordinate data A stored in memory 130, as based on contact position S of stylus pen 190. More specifically, coordinate processing unit 113 updates the topmost, bottommost, rightmost, and leftmost coordinates of contact position S of stylus pen 190 for a question for which a handwritten character is input (or a target question) and a center coordinate of a rectangle having the topmost, bottommost, rightmost, and leftmost coordinates as vertices (i.e., a rectangle surrounding the handwritten character). Alternatively, coordinate processing unit 113 updates a latest coordinate of contact position S of stylus pen 190 for the target question. Alternatively, coordinate processing unit 113 updates a center position of answer area Y of the target question.

Scroll processing unit 114 refers to clock 160 to obtain therefrom time elapsing since coordinate detection unit 111 no longer detects contact position S of stylus pen 190. Time thus elapses, and once it has reached a predetermined time, scroll processing unit 114 determines a position to display the content such that a next question's answer area Y has its center at a position indicated by reference coordinate data A. For example, scroll processing unit 114 determines an amount of scrolling the content displayed.

More specifically, scroll processing unit 114 determines the amount to be scrolled, as follows: once contact position S of stylus pen 190 detected in answer area Y of question 1 has no longer been detected, then a predetermined period of time is awaited and thereafter answer area Y of a next question (or question 2) moves to a position indicated by reference coordinate data A. Note, however, that scroll processing unit 114 may determine the amount to be scrolled only in the y direction to allow the next question's answer area Y to have its center with a y coordinate matching that indicated by reference coordinate data A.

Question display processing unit 115 redisplays the content, based on question data 133, when scroll processing unit 114 determines that time has elapsed and reached the predetermined time. For example, once contact position S of stylus pen 190 detected in answer area Y of question 1 has no longer been detected, then question display processing unit 115 refers to question data 133 to redisplay the content so that the next question has its answer area Y matching relative position T from the current contact position R of the palm. Note, however, that question display processing unit 115 may redisplay the content to allow the next question's answer area Y to have its center with a y coordinate matching that indicated by reference coordinate data A.

Note that preferably question display processing unit 115 refers to question display area data 134 and handwritable area data 135 to cause touchscreen panel 120 to display content to display the next question's (or question 2's) question area X and answer area Y altogether on touchscreen panel 120. In other words, question display processing unit 115 causes touchscreen panel 120 to display the content such that the next question's (or question 2's) question area X and answer area Y are accommodated on touchscreen panel 120 in the display area.

<Content Display Process>

Figure 11:
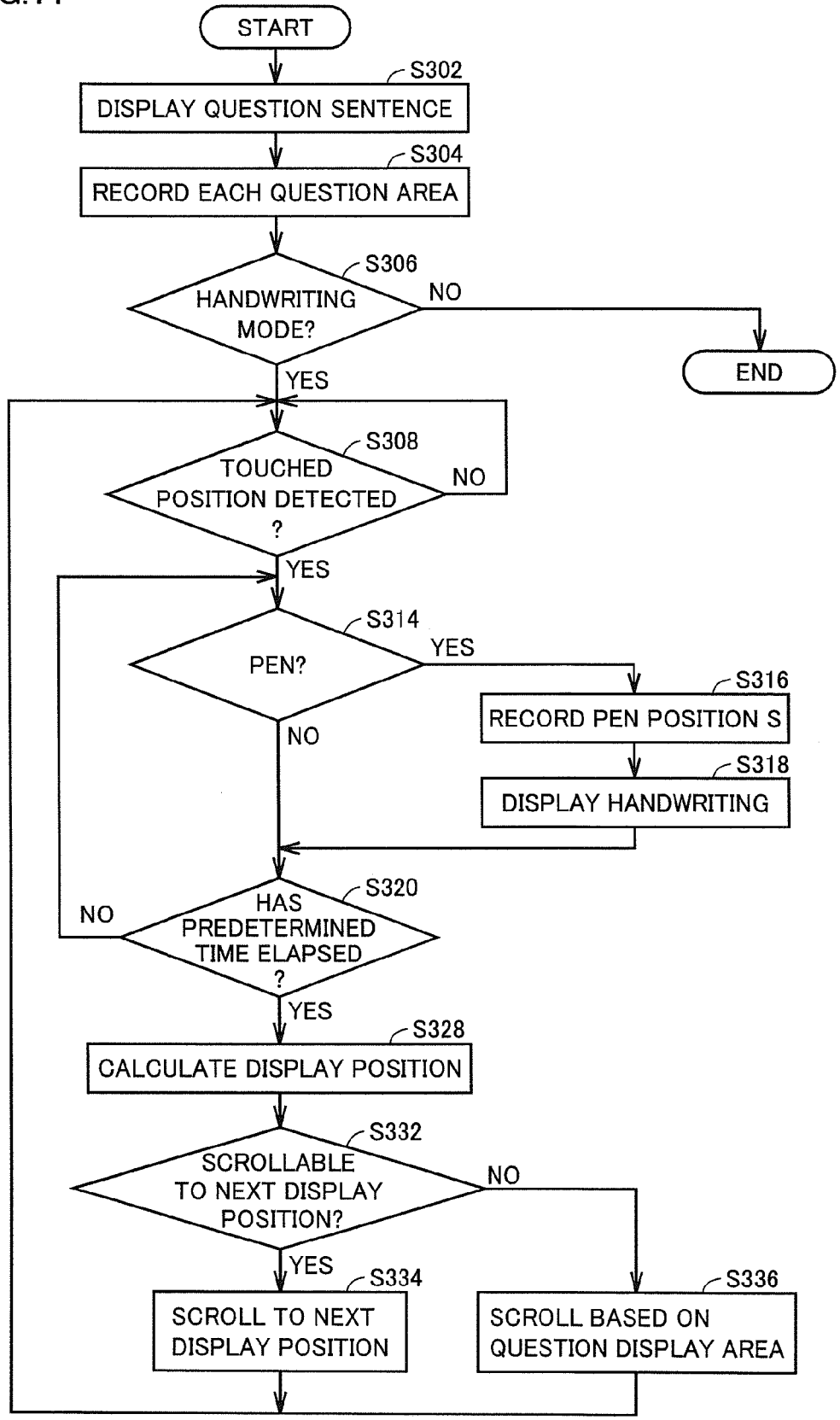
FIG. 11 is a flowchart of a content display process according to the third embodiment.

CPU 110 according to the present embodiment performs a content display process, as will be described hereinafter. FIG. 11 is a flowchart of a content display process according to the third embodiment.

With reference to FIG. 11, CPU 110 reads question data 133 from memory 130, and causes touchscreen panel 120 to display question 1 entirely, question 2 entirely, and question 3 partially thereon (Step S302). CPU 110 stores question display area data 134 and handwritable area data 135, based on the question data, to memory 130 for each question (Step S304).

CPU 110 determines whether a handwriting mode is selected (Step S306). For example, CPU 110 determines which one is selected from a mode allowing stylus pen 190 or the like to be used to handwrite and thus input a character, a mode allowing a software button to be used to input a character, and a mode allowing a hardware button to be used to input a character.

If the handwriting mode is not selected (NO in Step S306), CPU 110 ends the content display process. In that case, a screen is scrolled in accordance with a normal scroll instruction, for example.

If the handwriting mode is selected (YES in Step S306), CPU 110 detects a contact position via touchscreen panel 120. If no contact position can be detected (NO in Step S308) CPU 110 repeats Step S308.

CPU 110 determines whether stylus pen 190 is in contact with touchscreen panel 120 (Step S314). If stylus pen 190 is in contact with touchscreen panel 120 (YES in Step S314), CPU 110 stores contact position S of stylus pen 190 to memory 130 as reference coordinate data A (Step S316).

CPU 110 causes touchscreen panel 120 to vary a manner of displaying a position corresponding to contact position S of stylus pen 190 (e.g., brightness) (Step S318). More specifically, CPU 110 stores contact position S of stylus pen 190 to memory 130 as handwriting data 131. Then, CPU 110 causes touchscreen panel 120 to display an input handwritten character along handwriting data 131 (or a locus of contact position S of stylus pen 190). CPU 110 performs step S320 et seq.

If stylus pen 190 is not in contact with touchscreen panel 120 (NO in Step S314), CPU 110 refers to clock 160 to determine whether a predetermined period of time has elapsed since contact position S of stylus pen 190 was no longer detected (Step S320). If the predetermined period of time has not yet elapsed since contact position S of stylus pen 190 was no longer detected (NO in Step S320) CPU 110 repeats step S314 et seq.

If the predetermined period of time has elapsed since contact position S of stylus pen 190 was no longer detected (YES in Step S320), CPU 110 calculates a position at which a next question's answer area Y should be displayed (Step S328). More specifically, CPU 110 sets based on reference coordinate data A as a position at which answer area Y should be displayed a center position of a rectangle surrounding a handwritten character input to answer area Y of question 1 or contact position S of stylus pen 190 that is latest immediately before the nib of stylus pen 190 is no longer detected.

CPU 110 tries to match center W2 of answer area Y of question 2 to the position at which the next answer area Y should be displayed. With question 2 having its answer area Y with center W2 matched to the position at which the next answer area Y should be displayed, CPU 110 determines whether question 2 has its question area X and answer area Y both entirely accommodated on touchscreen panel 120 in the display area (Step S332).

If question 2 having its answer area Y with center W2 matched to the position at which the next answer area Y should be displayed has its question area X and answer area Y both entirely accommodated on touchscreen panel 120 in the display area (YES in Step S332), CPU 110 scrolls the screen so that question 2 has its answer area Y with center W2 matched to the position at which the next answer area Y should be displayed (Step S334). CPU 110 repeats step S308 et seq.

If question 2 having its answer area Y with center W2 matched to the position at which the next answer area Y should be displayed fails to have its question area X and answer area Y both entirely accommodated on touchscreen panel 120 in the display area (NO in Step S332), CPU 110 scrolls the screen so that question 2 has its question area X and answer area Y accommodated on touchscreen panel 120 in the display area (Step S336). For example, CPU 110 scrolls the screen to allow question 2 to have an upper end displayed at that of touchscreen panel 120. CPU 110 repeats step S308 et seq.

<Other Applications>

It is needless to say that the present invention is also applicable to a case achieved by supplying a program to a system or a device. Then the present invention's effect can also be exploited in such a manner that external storage medium 141 (or memory 130) having stored therein a program represented by software for achieving the present invention is supplied to the system or the device and that system or device's computer (or CPU, MPU, or the like) reads and executes a program code stored in external storage medium 141 (or memory 130).

In that case, the program code per se read from external storage medium 141 (or memory 130) will implement a function of the embodiment as described above, and external storage medium 141 (or memory 130) that has the program code stored therein will configure the present invention.

Furthermore, it is needless to say that a case is also included in which the program code that the computer has read can be executed to not only implement the function of the embodiment as described above but also allow an operating system (OS) that is operating in the computer to follow the program code's instruction to perform an actual process partially or entirely to thereby implement the function of the embodiment as described above.

Furthermore, it is needless to say that a case is also included in which the program code that is read from external storage medium 141 (or memory 130) is written to another storage medium included in a functionality extension board inserted in the computer, a functionality extension unit connected to the computer or the like and subsequently a CPU or the like included in that functionality extension board or unit follows the program code's instruction to perform an actual process partially or entirely to thereby implement the function of the embodiment as described above.

It should be understood that the embodiments disclosed herein have been described for the purpose of illustration only and in a non-restrictive manner in any respect. The scope of the present invention is defined by the terms of the claims, rather than the description above, and is intended to include any modifications within the scope and meaning equivalent to the terms of the claims.

REFERENCE SIGNS LIST

100: electronic note; 110: CPU; 111: coordinate detection unit; 112: handwriting processing unit; 113: coordinate processing unit; 114: scroll processing unit; 115: question display processing unit; 120: touchscreen panel; 121: display; 122: tablet; 130: memory; 131: handwriting data; 133: question data; 134: question display area data; 135: handwritable area data; 140: memory interface; 141: storage medium; 150: communication interface; 160: clock; 190: stylus pen; A: reference coordinate data; B: reference coordinate data; C: reference coordinate data; Q: contact area; R: contact position of palm; S: contact position of stylus pen; T: relative position; W1; center of answer area of question 1; W2: center of answer area of question 2; X: question area; Y: answer area.

The invention claimed is:

1. An electronic device comprising:
   a touchscreen panel;
   a memory for storing content having a plurality of areas; and
   a processor for obtaining a first touched position that is a contact position of a palm on said touchscreen panel,
   said processor obtaining a contact position of a pen on said touchscreen panel as a second touched position,
   when said processor causes said touchscreen panel to display a first area of said plurality of areas thereon at a predetermined position based on said first touched position, and in that condition said second touched position has not been input for a predetermined period of time since a last input at the second touched position, then, said processor causing said touchscreen panel to display a second area of said plurality of areas thereon at said predetermined position by scrolling said second area to said predetermined position,
   wherein the processor causes said touch panel to fix a display position of the first area at the predetermined position even when the obtained contact position of the pen moves within the first area.

2. The electronic device according to claim 1, wherein said processor:
   stores said second touched position as relative to said first touched position to said memory as a first relative position; and
   causes said touchscreen panel to display a predetermined area of said plurality of areas thereon at said first relative position relative to said first touched position.

3. An electronic device comprising:
   a touchscreen panel;
   a memory for storing content having a plurality of areas; and
   a processor for obtaining a first touched position that is a contact position of a pen on said touchscreen panel,
   when said processor causes said touchscreen panel to display a first area of said plurality of areas thereon at a predetermined position based on said first touched position, and in that condition said first touched position has not been input for a predetermined period of time since a last input at the first touched position, then, said processor causing said touchscreen panel to display a second area of said plurality of areas thereon at said predetermined position by scrolling said second area to said predetermined position, wherein the processor causes said touch panel to fix a display position of the first area at the predetermined position even when the obtained contact position of the pen moves within the first area.

4. The electronic device according to claim 3, wherein said processor causes said touchscreen panel to display said content thereon such that said first touched position matches said predetermined position.

5. The electronic device according to claim 4, wherein said processor stores a center of a rectangle surrounding said contact position of said pen to said memory as said first touched position based on time series data of said contact position of said pen on said touchscreen panel.

6. The electronic device according to claim 1, wherein:
said plurality of areas are each a handwritten input receivable area set for said content.

7. The electronic device according to claim 6, wherein:
a handwritten input unreceivable area is further set for said content; and
when said processor causes said touchscreen panel to display said first area thereon at a predetermined position based on said first touched position, said processor causes said touchscreen panel to display thereon said handwritten input unreceivable area associated with said first area, and when said processor causes said touchscreen panel to display said second area thereon at a predetermined position based on said first touched position, said processor causes said touchscreen panel to display thereon said handwritten input unreceivable area associated with said second area.

8. A method for displaying content in an electronic device including a memory for storing content having a plurality of areas, a touchscreen panel, and a processor, the method comprising the steps of:

obtaining, by said processor, a first touched position that is a contact position of a palm on said touchscreen panel;

obtaining, by said processor, a contact position of a pen on said touchscreen panel as a second touched position; and when said processor causes said touchscreen panel to display a first area of said plurality of areas thereon at a predetermined position based on said first touched position, and in that condition said second touched position has not been input for a predetermined period of time since a last input at the second touched position, then, causing, by said processor, said touchscreen panel to display a second area of said plurality of areas thereon at said predetermined position by scrolling said second area to said predetermined position, wherein said processor causes said touch panel to fix a display position of the first area at the predetermined position even when the obtained contact position of the pen moves within the first area.

* * * * *